(12) United States Patent
Stauder et al.

(10) Patent No.: US 8,164,591 B2
(45) Date of Patent: Apr. 24, 2012

(54) DEVICE, SERVER, SYSTEM AND METHOD TO GENERATE MUTUAL PHOTOMETRIC EFFECTS

(75) Inventors: Jürgen Stauder, Montreuil/III (FR); Bertrand Chupeau, Rennes (FR); Gérard Briand, Ploufragan (FR)

(73) Assignee: Thomson Licensing, Boulogne-Billancourt (FR)

( * ) Notice: Subject to any disclaimer, the term of this patent is extended or adjusted under 35 U.S.C. 154(b) by 1351 days.

(21) Appl. No.: 10/477,586

(22) PCT Filed: Apr. 30, 2002

(86) PCT No.: PCT/EP02/04749
§ 371 (c)(1),
(2), (4) Date: Nov. 13, 2003

(87) PCT Pub. No.: WO02/093492
PCT Pub. Date: Nov. 21, 2002

(65) Prior Publication Data
US 2004/0143786 A1    Jul. 22, 2004

(30) Foreign Application Priority Data
May 14, 2001 (EP) .................................. 01460035

(51) Int. Cl.
*G06T 15/50* (2006.01)
(52) U.S. Cl. ....................................................... 345/426
(58) Field of Classification Search .................... 345/426
See application file for complete search history.

(56) References Cited

U.S. PATENT DOCUMENTS

| | | | | |
|---|---|---|---|---|
| 5,572,235 A | * | 11/1996 | Mical et al. | 345/600 |
| 5,870,097 A | * | 2/1999 | Snyder et al. | 345/426 |
| 5,963,214 A | * | 10/1999 | Cok et al. | 345/630 |
| 6,016,150 A | * | 1/2000 | Lengyel et al. | 345/426 |
| 6,160,907 A | * | 12/2000 | Robotham et al. | 382/154 |
| 6,185,602 B1 | * | 2/2001 | Bayrakeri | 709/204 |

(Continued)

FOREIGN PATENT DOCUMENTS
EP          0794516 A2       9/1997
(Continued)

OTHER PUBLICATIONS

Yu, Yizhou; Debevec, Paul; Malik, Jitendra; Hawkins, Tim; "Inverse Global Illumination: Recovering Reflectance Models of Real Scenes from Photographs;" Aug. 1999; Computer Graphics Proceedings, ACM SIGGRAPH99, pp. 1-13.*

(Continued)

*Primary Examiner* — Ulka Chauhan
*Assistant Examiner* — Andrew G Yang
(74) *Attorney, Agent, or Firm* — Tutunjian & Bitetto, P.C.

(57) ABSTRACT

The invention concerns a device for generating mutual photometric effects and a server for delivering photometric parameters for generating mutual photometric effects and a system including such a device and such a server. The device comprises a receiver for receiving and demultiplexing the visual data sets and photometric parameters respectively associated with the data sets, a module for defining the mutual photometric effects to be generated for these photometric parameters, a compositor and a rendering module for positioning the visual data sets in the common support space and applying the effects defined for the photometric parameters from at least one of the visual data sets to at least one other of the visual data sets so that at least one visual data set influences one other visual data set in the common support space.

6 Claims, 3 Drawing Sheets

U.S. PATENT DOCUMENTS

| | | | |
|---|---|---|---|
| 6,195,088 B1* | 2/2001 | Signes | 715/201 |
| 6,215,495 B1* | 4/2001 | Grantham et al. | 345/419 |
| 6,263,496 B1* | 7/2001 | Meyer et al. | 717/114 |
| 6,272,650 B1* | 8/2001 | Meyer et al. | 714/38 |
| 6,329,994 B1* | 12/2001 | Gever et al. | 345/473 |
| 6,342,887 B1* | 1/2002 | Munroe | 345/426 |
| 6,459,429 B1* | 10/2002 | Deering | 345/423 |
| 6,473,794 B1* | 10/2002 | Guheen et al. | 709/223 |
| 6,476,805 B1* | 11/2002 | Shum et al. | 345/420 |
| 6,490,627 B1* | 12/2002 | Kalra et al. | 709/231 |
| 6,522,336 B1* | 2/2003 | Yuasa | 345/582 |
| 6,557,041 B2* | 4/2003 | Mallart | 709/231 |
| 6,593,925 B1* | 7/2003 | Hakura et al. | 345/426 |
| 6,614,431 B1* | 9/2003 | Collodi | 345/426 |
| 6,639,594 B2* | 10/2003 | Zhang et al. | 345/426 |
| 6,717,576 B1* | 4/2004 | Duluk et al. | 345/419 |
| 6,741,242 B1* | 5/2004 | Itoh et al. | 345/419 |
| 6,784,896 B1* | 8/2004 | Perani et al. | 345/589 |
| 6,819,325 B2* | 11/2004 | Boyd et al. | 345/559 |
| 6,833,840 B2* | 12/2004 | Lifshitz | 345/630 |
| 6,850,243 B1* | 2/2005 | Kilgariff et al. | 345/582 |
| 7,034,851 B1* | 4/2006 | Furui et al. | 345/660 |
| 7,057,612 B2* | 6/2006 | Balfour | 345/419 |
| 7,142,216 B2* | 11/2006 | Boyd et al. | 345/522 |
| 7,149,770 B1* | 12/2006 | Kalva et al. | 709/203 |
| 7,262,770 B2* | 8/2007 | Sloan et al. | 345/426 |
| 2001/0037402 A1* | 11/2001 | Schneider | 709/236 |
| 2001/0041061 A1* | 11/2001 | Nakagawa | 386/111 |
| 2002/0067355 A1* | 6/2002 | Randel | 345/426 |
| 2002/0080168 A1* | 6/2002 | Hilliard et al. | 345/744 |
| 2002/0129374 A1* | 9/2002 | Freeman et al. | 725/91 |
| 2003/0058241 A1* | 3/2003 | Hsu | 345/426 |
| 2003/0085904 A1* | 5/2003 | Kulczycka | 345/581 |
| 2004/0201586 A1* | 10/2004 | Marschner et al. | 345/426 |
| 2006/0139351 A1* | 6/2006 | Munshi | 345/426 |

FOREIGN PATENT DOCUMENTS

| | | |
|---|---|---|
| EP | 0865001 A2 | 9/1998 |
| JP | 9-319894 | 12/1997 |
| WO | 98/59322 | 12/1998 |
| WO | 99/01846 | 1/1999 |
| WO | 99/18542 | 4/1999 |

OTHER PUBLICATIONS

Kalva, Hari et al.; "Implementing Multiplexing, Streaming, and Sever Interaction for MPEG-4;" Dec. 1999; IEEE Transactions on Circuits and Systems for Video Technology; vol. 9, No. 8; pp. 1299-1312.*

Barzel "Lighting Controls for Computer Cinematography" 1997, Journal of Graphics Tools, pp. 1-8.*

Kunihiko Kaneko et al., *Towards Dynamics Animation on Object-Oriented Animation Database System "Move"*, Department of Computer Science and Communication Engineering, Kyushu University, Japan, Proceedings of the Int'l. Symposium on Database Systems for Advanced Applications, 1993, pp. 3-10, XP000569110.

Anonymous, "The Virtual Reality Modeling Language (VMRL)", International Standard (ISO/IEC 14772-1:1997).

Kitazawa et al., "A Survey on Network-Based 3DCG System", Research Report of the Institute of Electronics, Information and Communication Engineers, Institute of Electronics, Information and Communication Engineers Japan, vol. 98, No. 322, Oct. 15, 1998, pp. 89-96. English Abstract.

* cited by examiner

DEVICE, SERVER, SYSTEM AND METHOD TO GENERATE MUTUAL PHOTOMETRIC EFFECTS

This application claims the benefit under 35 U.S.C. §365 of International Application PCT/EP02/04749, filed Apr. 30, 2002, which claims the benefit of European Patent Application No. 01460035.7, filed May 14, 2001.

FIELD OF THE INVENTION

The invention concerns a method and device to generate mutual photometric effects in a common support space between a plurality of visual data sets.

BACKGROUND OF THE INVENTION

Applying special effects methods has been for a long time a working field in the industry. More and more, applications, such as interactive television, or any multimedia applications bring the need of efficient data manipulation.

The invention concerns particularly the merging of different data sets for displaying and the mutual interaction of these different data sets. Namely, in order to improve the interaction between visual data sets, audiovisual data sets or other multi-modal data sets, it is important that some parameters of the different data sets modify the other data sets and among these parameters, the illumination and the reflection.

To result in a realistic or nice looking final image, mutual photometric effects between different visual data sets have to be considered. This is especially true when importing a three-dimensional object in front of a video sequence for instance.

Various methods exist to apply mutual photometric effects to visual data, like shading, specular reflections, cast shadows, mutual illumination.

In film production, professional tools are used to generate photometric special effects off-line. These tools need as input the photometric properties of the visual data as for example light sources or surface reflection properties. Before generating photometric special effects, film production experts recover the photometric properties visually or the photometric properties are measured using measuring tools during film production in the real scene.

In research laboratories, photometric characteristics can be recovered today off-line by automatic algorithms of very high computational cost or by semi-automatic manual interaction.

The off-line or interactive recovering of photometric properties does not allow a real time treatment of the visual data sets for generating photometric special effects.

In the MPEG-7 (MPEG standing for "Motion Picture Expert Group") proposal n° 99 entitled "An illumination effect descriptor for video sequences", Stauder proposes to describe illumination properties implicitly by image signal changes for content-based visual information retrieval.

The invention allows a real time treatment of the visual data sets for generating photometric special effects, describing illumination properties in term of light sources for special effect generation.

In a first aspect, the invention proposes a device to generate mutual photometric effects between a plurality of visual data sets, comprising means to position the visual data sets in a common support space characterized in that it comprises:
  means for receiving and demultiplexing said visual data sets and photometric parameters respectively associated with said data sets,
  means for defining said mutual photometric effects to be generated for these photometric parameters,
  composition and rendering means for positioning said visual data sets in said common support space and applying said effects defined for said photometric parameters from at least one of said visual data sets to at least one other of said visual data sets so that at least one visual data set influences one other visual data set in said common support space.

The invention allows the generation of mutual photometric effects by using the photometric parameters that are transmitted with the visual data sets to be displayed and so can avoid the use of complex devices or methods needed to extract the photometric properties from the visual data sets on the device. In fact the devices that could typically generate mutual photometric effects are low cost devices or consumer products which price has to be reduced. So, it is a great advantage to dissociate this functionality from the device and to provide means to treat the photometric parameters received from an outside terminal.

The means for defining the effects to be generated for the photometric parameters have the capability to define how meta data associated to multimedia data influence other multimedia data. It generates some information called "rendering modi" which represents this influence. This enables the composition and rendering means to display the visual data sets, while applying the photometric effects on these data sets.

The invention is thus particularly interesting in systems providing meta data such as systems providing MEPG-4 coded data and MPEG-7 coded data.

According to a second aspect, the invention proposes a server (Aj) for delivering multimedia data including visual data sets associated with respective photometric parameters for said visual data sets, characterized in that it comprises
  means for managing the storage and conditioning of photometric parameters for said visual data sets,
  means for transmitting over a transmission link (Cj) said multimedia data bundled with their associated photometric parameters, said multimedia data including means to display at least one of the visual data sets with another of said visual data sets in a common support space.

This server enables the preparation of photometric parameters to be used for instance with a device according to the first aspect of the invention.

However, this server can be used with any other terminal that would need photometric parameters as input parameters.

This server has the great interest to deliver the multimedia data associated with photometric parameters related to them. This avoids, on a corresponding receiver, the generation of photometric parameters.

According to a third aspect, the invention proposes a multimedia system characterized in that it comprises
  at least one server (Aj) according to any of claim 6 to 7 for delivering multimedia data including at least two visual data sets associated with photometric parameters for visual data sets,
  means (Cj) for transmitting said visual data sets and their respective photometric parameters bundled together from said server to at least one device according to any of claims 1 to 5,
  a device according to any of claims 1 to 5 to generate mutual photometric effects for applying the effects of said delivered photometric parameters of at least one of said delivered visual data sets to at least another of said delivered visual data sets so that said visual data sets influences said other visual data set in a common support space.

According to a fourth aspect, the invention concerns also a method to generate mutual photometric effects between a plurality of visual data sets, wherein one positions the visual data sets in a common support space, characterized in that:

one delivers multimedia data including at least two visual data sets respectively associated with photometric parameters for visual data sets, one transmits, bundled together, said visual data sets and their respective photometric parameters to at least one managing means, one defines dynamically said mutual photometric effects for the photometric parameters and their associated visual data sets, and one applies said effects defined by said photometric parameters from at least one of said visual data sets to at least another of said visual data sets so that said visual data set influences said other visual data set.

The invention concerns also a television receiver, a set-top box, or any fixed or mobile terminal having the characteristics of the device to generate mutual photometric effects mentioned above, the advantages of the television receiver, the set-top box, the fixed or mobile terminal being the same as the ones of the device to generate mutual photometric effects.

BRIEF DESCRIPTION OF THE DRAWINGS

Other characteristics and advantages of the invention will appear through the description of a non-limiting embodiment of the invention, which will be illustrated, with the help of the enclosed drawings among which

DETAILED DESCRIPTION

Figure 1:
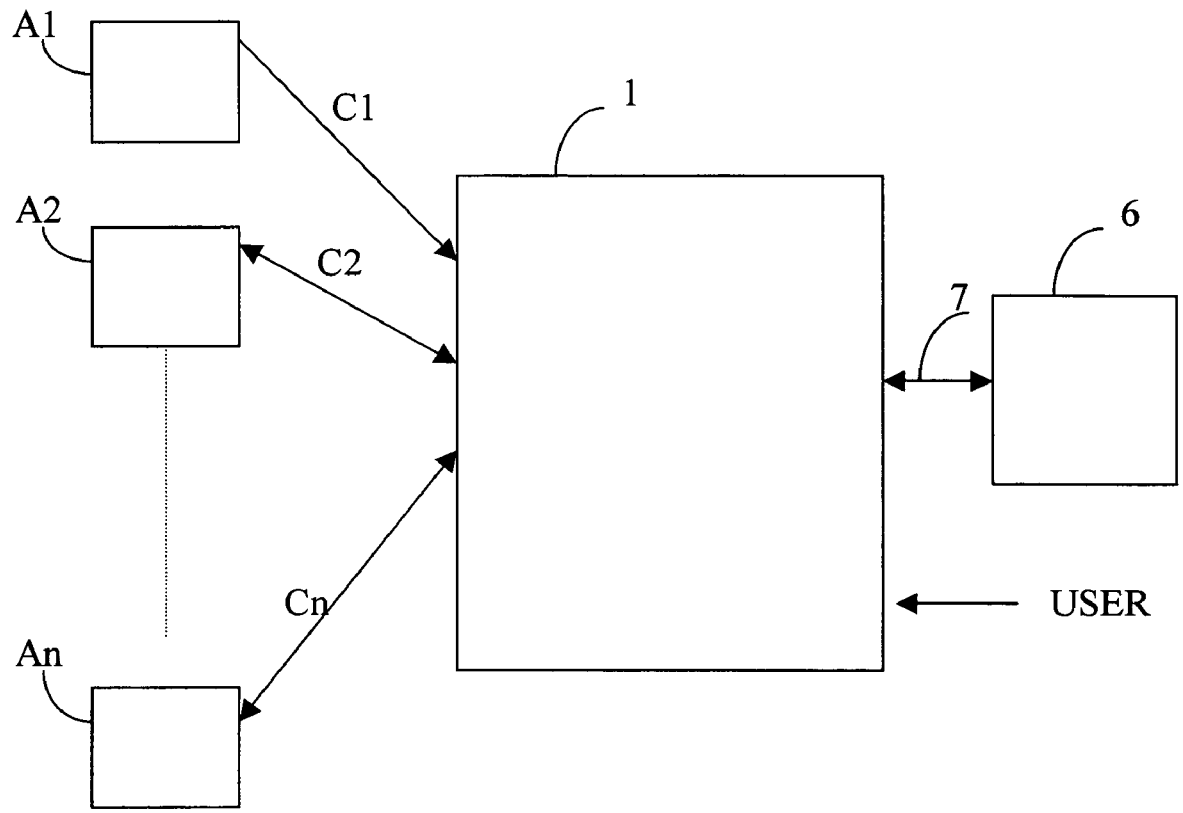
FIG. 1 represents a system according to the invention.

FIG. 1 illustrates a system for generating mutual photometric effects according to the invention including a device 1 for generating mutual photometric effects according to the invention connected to a display 6 through a connection link 7. Said device 1 is also connected to n servers (A1, A2, ..., Aj, ..., An) through transmission links (C1, C2, ..., Cj, ..., Cn).

Figure 2:
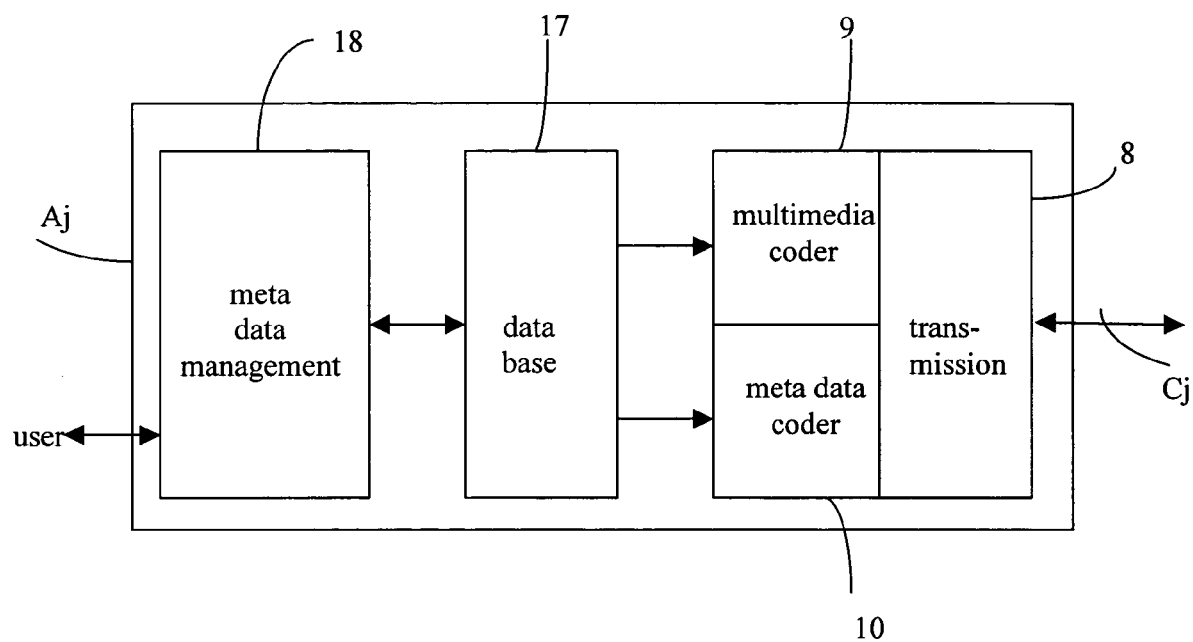
FIG. 2 represents a server according to the invention.
Figure 3:
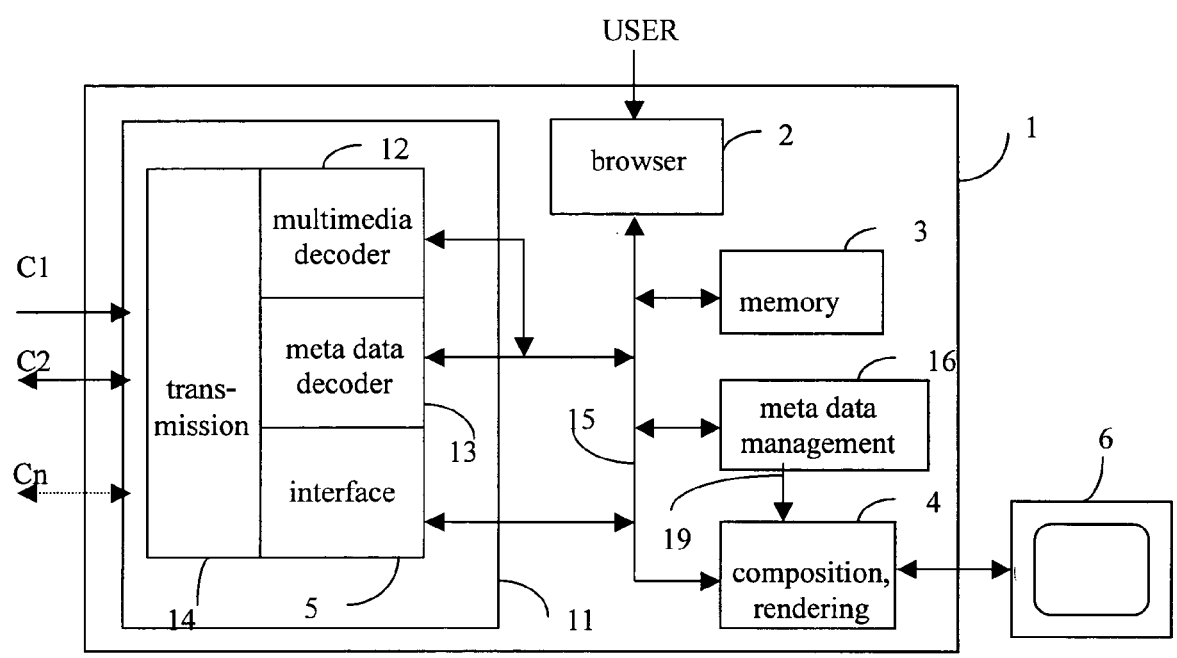
FIG. 3 represents a device according to the invention.

The servers A1, A2, ..., Aj, ..., An are represented on FIG. 2 and the device 1 according to the invention is represented on FIG. 3.

Transmission links C1, C2, ..., Cj, ..., Cn can be all of the same type or can be of different types. In a preferred embodiment, as represented on FIG. 1, transmission link C1 is different from transmission links C2, C3, ..., Cj, ..., Cn. In this embodiment, transmission link C1 is a broadcast link. The transmission links C2, C3, ..., Cj, ..., Cn are for example Internet links. This corresponds to the case when a user is watching television programs received from a broadcaster from server A1 and wants to display on display 6 some pictures selected from an Internet web site he receives from one of the servers A2, A3, ..., Aj, ..., An.

FIG. 2 shows a bloc diagram of any of the servers A1, A2, ..., Aj, ..., An. Such a server includes a database 17, a multimedia coder 9, a meta data coder 10, a meta data management module 18 and a transmission module 8.

The database 17 contains multimedia data and meta data. Multimedia data can be audiovisual data streams, 3D scenes, hyper documents, or any kind of multi or single modal data.

The meta data represent the photometric properties of the stored multimedia data. It can be a single light source or several light sources of different shapes (point light, area light) and different kind of intensities (monochrome, coloured, spatially constant or spatially varying). Instead of light sources, also illumination maps or global illumination descriptors can be used. Photometric meta data can contain transparency and refraction.

Other meta data than illumination can be foreseen. For example, meta data can contain a sequence of reflectance maps. The sequence of reflectance maps associates one reflectance map to each video image. Each pixel of the reflectance map contains one or more parameters describing the reflection properties of the corresponding video pixel. By such a sequence of reflectance maps, special effects like specular reflections in a video can be generated. Other representations of reflection can be used, for example symbolic or numerical reflection functions or reflectance maps combined with depth maps.

The meta data management module 18 generates and manages the meta data and associates them to the multimedia data. The meta data generation can be offline or online. It can be user assisted or automatic. Pre-calculated meta data can be used, the multimedia data can be used, or other data can be used.

The meta data are associated to the multimedia data. For example, a light source is associated to a video image or to a video sequence, a reflectance map is associated to a 3D object, or a reflectance map and a depth map are associated to a video image. Therefore, the meta data contain also means to display at least another visual data set with that visual data set in a common support space. These means include means to establish a relationship between meta data and multimedia data.

That relationship can be distance or relative position between meta data elements and multimedia data elements. The geometric relationship can be also represented by a geometric scene description. The geometric relationship defines how multimedia data elements such as video images or 3D objects and meta data such as light sources or reflection maps are positioned in a common support space. The common support space can be a plane, a 3D surface, a 3D space or any other space.

That relationship also describes, whether a meta data element has the capability to influence a multimedia data element or not. For example, a light source representing the illumination of a video image can influence another multimedia data element but not the video image itself.

That relationship can refer to multimedia data elements and meta data elements of the data base 17 or to generic data elements that are not known to the server Aj. By this, multimedia data elements from server Aj and multimedia data elements from other servers can be displayed on the display 6 of device 1 in a common support space influencing themselves mutually by consideration of their photometric properties such as illumination and reflection contained in the meta data.

The management module 18 manages the meta data. For example, it can decide to transmit or not a certain meta data associated to a multimedia data that is demanded by device 1. It defines also the type of coding mode, the kind of association of the photometric parameters to multimedia data. These decisions may depend on the type and state of the transmission link Cj, on the type and state of device 1, on the type or quality level of service, on pricing and payment mode, or on other criteria such as the profile of user using device 1. Module 18 may also decide on spatial resolution, numerical precision or size of meta data to be generated or to be transmitted. Management module 18 can do other management tasks related to the generation of meta data, storage of meta data in the database, coding of meta data or transmission of meta data.

The type of the multimedia coder 9 depends on the kind of multimedia data and may be a video coder according to the MPEG-4 simple profile, a 3D data coder as MPEG-4 BIFS (standing for "Binary Information for Scene") or any other kind of multimedia data coder.

The meta data coder 10 compresses the meta data and depends on the kind of meta data. In case of reflection maps, the meta data coder can contain a video coder, for example MPEG-4 simple profile, MPEG-4 core profile or JPEG (standing for "Joint Picture Expert Group"). For illumination parameters, the meta data decoder can contain an MPEG-4 BIFS module or a VRML (standing for "Virtual Reality Modeling Language") module. The meta data decoder can contain other modules as floating point number coder, ASCII (standing for "American National Standard Code for Information Interchange") coder, or any other kind of coder.

The transmission module 8 depends on the kind of transmission links C1, C2, . . . , Cj, . . . , Cn used and on the type of device 1 used. The transmission module 8 performs transmission and reception related tasks as modulation, demodulation, multiplexing, synchronization and error correction. Other transmission related operations are possible. Transmission links C1, C2, . . . , Cj, . . . , Cn transmit multimedia data, photometric meta data and signalling information.

On FIG. 3, a device 1 for generating mutual photometric effects according to the invention is represented. Said device includes a browser 2 that is connected to a memory 3, to a composition/rendering means 4, to an interface 5, to a multimedia decoder 12, a meta data decoder 13 and a meta data management module 16 through a communication bus 15.

The browser 2 is an interface with a user, which allows the user to select the multimedia data he wants to display on display 6. The selected multimedia data are requested via the interface 5 and the request is sent through communication links C1, C2, . . . , Cj, . . . , Cn, respectively, to servers A1, A2, . . . , Aj, . . . , An. The browser 2 can be accessed through a remote controller, through a keyboard or any man machine interface (not represented on the drawings). The browser can be for example a graphical interface.

The memory 3 stores multimedia data, meta data and browser related parameters received from the servers A1, A2, . . . , Aj, . . . , An and to be displayed on display 6.

The bus 15 is used for interconnecting the different modules of the device 1.

A module 11 includes said multimedia decoding module 12, said meta data decoding module 13, said interface 5 and a transmission module 14.

Multimedia decoder 12 decodes the multimedia data coded by the multimedia data coder 9 of one of the servers A1, . . . , Aj, . . . , An.

Meta data decoder 13 decodes the meta data coded by the meta data coder 10 of one of the servers A1, . . . , Aj, . . . , An.

The transmission module 14 depends on the kind of transmission links C1, C2, . . . , Cj, . . . , Cn and kind of servers A1, . . . , Aj, . . . , An used. The transmission module 14 performs transmission and reception related tasks as modulation, demodulation, multiplexing, demultiplexing, synchronization and error correction. Other transmission related operations are possible.

The meta data management module 16 manages the meta data received by the communication links C1, C2, . . . , Cj, . . . , Cn and stored in the memory 3. Management tasks are for example the spatial resolution and numerical precision of the stored meta data, the decision whether meta data is received and stored or not, the selection of meta data to be transmitted to the composition/rendering module 4.

A number of rendering modi 19 are determined by meta data management module 16 for the multimedia data elements and the meta data elements. The rendering modi determine by which meta data elements a multimedia data element is influenced and which meta data elements have no effect on it.

The rendering modi 19 is explained by the following example. If a user selects via the browser 2 the transmission of a video sequence from server A1 and a 3D object from server A2, and if the server A1 associates a light source to the video sequence and the server A2 associates a reflectance map to the 3D object, knowing that said light source and said reflectance map are transmitted respectively together with said video sequence and said 3D object to the device 1, the rendering mode may be to let the light source illuminate only the 3D object and not the video sequence and, furthermore, to prevent from reflections from the 3D object onto the video sequence.

Furthermore, the rendering modi 19 may not only determine whether there is an influence between meta data and multimedia data, but may also determine how a meta data element influences a multimedia data element during composition/rendering. Therefore, the rendering modi 19 may define the spatial resolution of meta data used, the type and numerical precision of used light distribution or colour models, or any other parameters defining the influence of a meta data to a multimedia data element.

Composition/rendering module 4 positions the multimedia data in a common support space assisted by the user thanks to the browser 2. The common support space can be a 2D plane, a 3D space or any other common space. The visual parts of the multimedia data are rendered considering the photometric meta data and the rendering modi 19 determined by meta data management module 16. Audio data are composed of at least one audio signal.

We are going now to describe through a non-limitative embodiment the treatment of the request of a user.

When a user wants to display an object on display 6 while watching a video movie for example, he selects the requested object thanks to the browser 2. The requested object is issued from one of the remote server A1, A2, . . . , Aj, . . . , An. The request is sent from browser 2 to the interface module 5 and through the transmission links C1, C2, . . . , Cj, . . . , Cn. Depending on the type of networks it is a broadcast request or a unicast request and the interface module depends also on the type of network. The interface module can also include several sub-modules if the links C1, C2, . . . , Cj, . . . , Cn are of different types as explained earlier.

Then the request is received by the transmission module 8 of one of the servers A1, A2, . . . , Aj, . . . , An. The requested data is then extracted from the database with its associated meta data. These meta data have been generated by the meta data management module 18 or is stored in the data base 17. Then the requested data and their associated meta data are respectively sent to the multimedia coder 9 and to the meta data coder 10. Once coded, both are associated together in the transmission module 8. The type of association depends on the protocol used on the links C1, C2, . . . , Cj, Cn. They can be associated for instance according to TCP/IP protocol if the links are internet links.

The coded data are transmitted to the device 1 through the transmission links Cj and received on the transmission module 14 of device 1. The transmission module demultiplexes the received data and meta data according to the protocol used on the links. Then the data and the associated meta data are respectively decoded by the multimedia decoder 12 and the meta data decoder 13. The data are then sent to the memory 3 and treated by the meta data management module 16. This meta data management module 16 determines the rendering modi to be used by the composition rendering module.

Then the composition and rendering module 4 treats the data and the modi and sends the composed data to the display 6.

The invention claimed is:

1. Device to generate mutual photometric effects between a plurality of visual data sets, comprising means to position the visual data sets in a common support space characterized in that it comprises:

means for receiving and demultiplexing said visual data sets and photometric parameters respectively associated with said data sets, means for defining said mutual photometric effects to be generated from these photometric parameters on the basis of at least one rendering modi, said rendering modi defining by which visual data sets a given visual data set is influenced and how said given visual data set is influenced, composition and rendering means for positioning said visual data sets in said common support space and applying said effects defined for said photometric parameters from at least one of said visual data sets to at least one other of said visual data sets so that at least one visual data set influences one other visual data set in said common support space.

2. Device according to claim 1 wherein the means for defining the effects of said photometric parameters manage at least one of their storage, their numerical precision, their spatial resolution and their rendering together with visual data sets.

3. Device according claim 1 wherein the photometric parameters are illumination and reflection properties, the illumination properties being selected from among the spatial intensity distribution of light, the position of light sources, the shape and the color of light sources and the reflection properties being selected from among the surface color, the specular color, the reflection geometry and the polarization.

4. Device according to claim 1 wherein the composition and rendering means for applying the effects described by said photometric parameters generate special effects from among the following special effects shading, cast shadows, self shadowing, specular reflections, inter-reflections or color effects.

5. Device according claim 1 wherein the visual data sets comprise at least one of still data, dynamic data, compressed data, raw data, panoramic data, three-dimensional data or image data.

6. Method to generate mutual photometric effects between a plurality of visual data sets, comprising the steps of:

positioning the visual data sets in a common support space;

delivering multimedia data including at least two visual data sets respectively associated with photometric parameters for visual data sets, transmitting, bundled together, said visual data sets and their respective photometric parameters to at least one managing means, defining dynamically said mutual photometric effects for the photometric parameters and their associated visual data sets on the basis of at least one rendering modi, said rendering modi defining by which visual data sets a given visual data set is influenced and how said given visual data set is influenced, and applying said effects defined by said photometric parameters from at least one of said visual data sets to at least another of said visual data sets so that said visual data set influences said other visual data set.

\* \* \* \* \*